(12) United States Patent
Hua et al.

(10) Patent No.: US 11,917,533 B2
(45) Date of Patent: *Feb. 27, 2024

(54) METHOD AND SYSTEM FOR NETWORK SLICE USAGE SUBSCRIPTION

(71) Applicant: Verizon Patent and Licensing Inc., Basking Ridge, NJ (US)

(72) Inventors: Suzann Hua, Walnut Creek, CA (US); Ye Huang, San Ramon, CA (US); Jude M. Munn, Pittsburg, CA (US); Parry Cornell Booker, Arlington, TX (US); Miguel A. Carames, Long Valley, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 54 days.

This patent is subject to a terminal disclaimer.

(21) Appl. No.: 17/568,775

(22) Filed: Jan. 5, 2022

(65) Prior Publication Data

US 2022/0132410 A1    Apr. 28, 2022

Related U.S. Application Data

(63) Continuation of application No. 16/835,467, filed on Mar. 31, 2020, now Pat. No. 11,252,653.

(51) Int. Cl.
| | | |
|---|---|---|
| *H04W 48/18* | (2009.01) | |
| *H04W 8/18* | (2009.01) | |
| *H04W 48/16* | (2009.01) | |
| *H04W 76/11* | (2018.01) | |

(52) U.S. Cl.
CPC ........... *H04W 48/18* (2013.01); *H04W 8/183* (2013.01); *H04W 48/16* (2013.01); *H04W 76/11* (2018.02)

(58) Field of Classification Search
CPC ..... H04W 48/18; H04W 48/16; H04W 76/11; H04W 8/183
USPC .......................................................... 370/329
See application file for complete search history.

(56) References Cited

U.S. PATENT DOCUMENTS

| | | |
|---|---|---|
| 10,644,955 B2 | 5/2020 | Zhang et al. |
| 10,958,524 B2 | 3/2021 | Yi et al. |
| 11,115,867 B2 | 9/2021 | Dowlatkhah et al. |
| 11,711,757 B2 * | 7/2023 | Liao ...................... H04W 48/18 370/329 |
| 11,716,646 B2 * | 8/2023 | Yao ...................... H04L 41/5009 455/435.1 |
| 2013/0100807 A1 | 4/2013 | Bhanage et al. |
| 2017/0245316 A1 | 8/2017 | Salkintzis |
| 2018/0317163 A1 * | 11/2018 | Lee ........................ H04W 16/02 |
| 2019/0029065 A1 | 1/2019 | Park et al. |

(Continued)

FOREIGN PATENT DOCUMENTS

WO    WO-2021063764 A1 *   4/2021   ............ H04W 16/02

*Primary Examiner* — Mong-Thuy T Tran (57) ABSTRACT

A method, a device, and a non-transitory storage medium are described in which a network slice usage subscription service is provided. The network slice usage subscription service may allow a network device to obtain network slice usage information and event notifications. The event notification may indicate when an end device is using a network slice and when the end device is no longer the network slice. The network device may include an application function (AF) device. The network device may use the event notification to perform an operation relating to the network slice and/or the end device.

20 Claims, 7 Drawing Sheets

(56) References Cited

U.S. PATENT DOCUMENTS

| | | |
|---|---|---|
| 2019/0053147 A1 | 2/2019 | Qiao et al. |
| 2019/0149434 A1 | 5/2019 | Chou et al. |
| 2019/0149666 A1 | 5/2019 | Senarath et al. |
| 2019/0191330 A1 | 6/2019 | Dao et al. |
| 2019/0342851 A1* | 11/2019 | Shan ................. H04W 12/06 |
| 2019/0357130 A1* | 11/2019 | Garcia Azorero ...... H04W 8/08 |
| 2019/0373441 A1 | 12/2019 | Ryu et al. |
| 2020/0100319 A1* | 3/2020 | Talebi Fard .......... H04W 76/32 |
| 2020/0145538 A1* | 5/2020 | Qiao ................. H04M 15/8038 |
| 2020/0187106 A1 | 6/2020 | Salkintzis et al. |
| 2020/0205065 A1 | 6/2020 | Wei et al. |
| 2020/0252813 A1* | 8/2020 | Li ....................... G06Q 20/382 |
| 2020/0413241 A1 | 12/2020 | Park et al. |
| 2021/0058297 A1 | 2/2021 | D'Acunto et al. |
| 2021/0091994 A1* | 3/2021 | Meirosu ............... H04L 12/1446 |
| 2021/0105308 A1 | 4/2021 | Bouazizi et al. |
| 2021/0153110 A1 | 5/2021 | Garcia Martin et al. |
| 2021/0281997 A1* | 9/2021 | Chai ....................... H04W 8/18 |
| 2021/0282038 A1* | 9/2021 | Li ....................... G06Q 20/4016 |
| 2021/0314266 A1* | 10/2021 | Li ........................... H04L 47/20 |
| 2022/0141762 A1* | 5/2022 | Kalra .................... H04W 60/04 370/329 |
| 2022/0240173 A1* | 7/2022 | Wang .................. H04W 40/248 |
| 2023/0080830 A1* | 3/2023 | Fernandez Alonso .. H04W 4/50 |

* cited by examiner

```
┌─────────────────────────────────────────────────┐
│ RECEIVE A NOTIFICATION THAT INCLUDES NETWORK SLICE │
│              USAGE INFORMATION                   │
│                      605                         │
└─────────────────────────────────────────────────┘
                        ↓
┌─────────────────────────────────────────────────┐
│  IDENTIFY, BASED ON THE NETWORK SLICE USAGE     │
│ INFORMATION, AN OPERATION TO PERFORM RELATING TO THE │
│     NETWORK SLICE AND/OR THE END DEVICE         │
│                      607                         │
└─────────────────────────────────────────────────┘
                        ↓
┌─────────────────────────────────────────────────┐
│ PERFORM THE OPERATION RELATING TO THE NETWORK SLICE │
│           AND/OR THE END DEVICE                 │
│                      610                         │
└─────────────────────────────────────────────────┘
```

Fig. 6

METHOD AND SYSTEM FOR NETWORK SLICE USAGE SUBSCRIPTION

CROSS REFERENCE TO RELATED APPLICATION

This patent application is a continuation of U.S. patent application Ser. No. 16/835,467, entitled "METHOD AND SYSTEM FOR NETWORK SLICE USAGE SUB SCRPTION" and filed on Mar. 31, 2020, the disclosure of which is incorporated herein by reference in its entirety.

BACKGROUND

Development and design of radio access networks (RANs), core networks, and application service networks, present certain challenges from a network-side perspective and an end device perspective. For example, depending on the configurations, features or services enabled (including network slicing) from both network-side and end device-side perspectives, such configurations may impact various performance metrics, such as accessibility, congestion, latency, throughput, etc. Accordingly, a need exists to overcome these challenges.

DETAILED DESCRIPTION

The following detailed description refers to the accompanying drawings. The same reference numbers in different drawings may identify the same or similar elements. Also, the following detailed description does not limit the invention.

Network slicing includes the creation of a logical sub-network in a network, such as in a Fifth Generation (5G) network or another type of network, and may support an application and/or a service (referred to as an "application service"). With network slicing, an end device may leverage different network slices for different application services to achieve optimal results. For example, if a user of user equipment (UE) wants to make a phone call or use a texting service, the UE may use a network slice that supports voice or text services. However, if the user of the UE wants to watch a high definition (HD) video, for example, the UE may use another network slice (e.g., an enhanced Mobile Broadband (eMBB) slice or other suitable network slice) via which to obtain the HD video service.

As part of this process, an access and mobility management function (AMF) device or a policy control function (PCF) device, may obtain network slice usage information pertaining to the end device. For example, the network slice usage information may indicate a network slice being used by the end device. However, there may be other network devices that could make use of the network slice usage information and improve network slice management and/or provisioning of an application service to the end device, among other things.

According to exemplary embodiments, a network slice usage subscription service is described. According to an exemplary embodiment, a network device may subscribe to the network slice usage subscription service. According to an exemplary embodiment, the network slice usage subscription service may provide network slice usage information to a subscribed network device, as described herein. For example, an application function (AF) device of a core network may subscribe to the network slice usage subscription service. According to an exemplary embodiment, the AF device may subscribe to the network slice subscription service via a network exposure function (NEF) device. According to other exemplary embodiments, another type of network device of the core network and/or a network device of a network external from the core network may subscribe to the network slice usage subscription service. The AF device may or may not be a third party device (e.g., relative to the end device and core network provider).

According to an exemplary embodiment, the network slice usage information may indicate that an end device (e.g., one or multiple end devices; a group of end devices, etc.) is using a network slice to access an application service. For example, when the end device is assigned a network slice via which to use an application service, the network slice usage information may indicate that the end device is using the network slice. Additionally, for example, the network slice usage information may indicate that the end device is no longer using the network slice. For example, when an application session of the network slice and the end device is terminated (e.g., the end device disconnects from any and all sessions of the network slice), the network slice usage information may indicate that the end device is no longer using the network slice.

According to an exemplary embodiment, the network slice usage information may include an identifier of the network slice and an end device identifier. According to other exemplary embodiments, the network slice usage information may include additional and/or different information.

The network slice usage information made available via the network slice subscription service described herein may be used to improve network source usage, various performance metrics in a network (e.g., throughput, latency, etc.), and/or provisioning of an application service.

Figure 1:
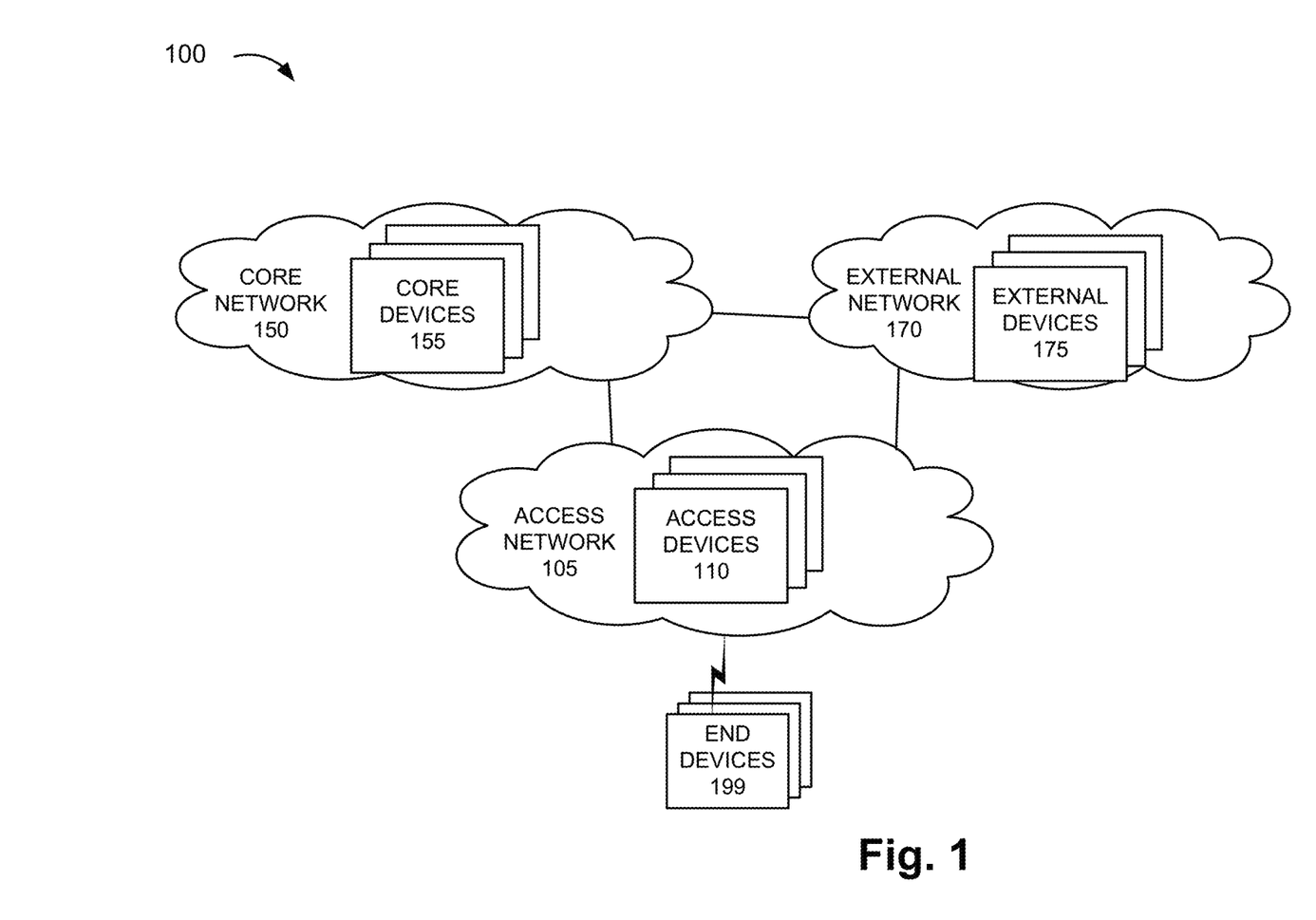
FIG. 1 is a diagram illustrating an exemplary environment in which an exemplary embodiment of a network slice usage subscription service may be implemented.

FIG. 1 is a diagram illustrating an exemplary environment 100 in which an exemplary embodiment of the network slice usage subscription service may be implemented. As illustrated, environment 100 includes an access network 105, a core network 150, and an external network 170. Access network 105 includes access devices 110, core network 150 includes core devices 155, and external network 170 includes external devices 175. Environment 100 further includes end devices 199.

The number, type, and arrangement of networks illustrated in environment 100 are exemplary. Additionally, or alternatively, other networks not illustrated in FIG. 1 may be included in environment 100, such as a backhaul network, a fronthaul network, or another type of intermediary network, as described herein.

The number, the type, and the arrangement of network devices in access network 105, core network 150, external network 170, as illustrated and described, are exemplary. The number of end devices 199 is exemplary. A network device, a network element, or a network function (referred to herein simply as a network device) may be implemented according to one or multiple network architectures (e.g., a client device, a server device, a peer device, a proxy device, a cloud device, a virtualized function, and/or another type of network architecture (e.g., Software Defined Networking (SDN), virtual, logical, network slicing, etc.)). Additionally, a network device may be implemented according to various computing architectures, such as centralized, distributed, cloud (e.g., elastic, public, private, etc.), edge, fog, and/or another type of computing architecture.

Environment 100 includes communication links between the networks, between network devices, and between end device 199 and network devices. Environment 100 may be implemented to include wired, optical, and/or wireless communication links among the network devices and the networks illustrated. A communicative connection via a communication link may be direct or indirect. For example, an indirect communicative connection may involve an intermediary device and/or an intermediary network not illustrated in FIG. 1. A direct communicative connection may not involve an intermediary device and/or an intermediary network. The number and the arrangement of communication links illustrated in environment 100 are exemplary.

Environment 100 may include various planes of communication including, for example, a control plane, a user plane, a service plane, and/or a network management plane. Environment 100 may include other types of planes of communication. A message communicated in support of the network slice usage subscription service may use at least one of these planes of communication. Additionally, an interface of a network device may be modified (e.g., relative to an interface defined by a standards body, such as Third Generation Partnership Project (3GPP), 3GPP2, International Telecommunication Union (ITU), European Telecommunications Standards Institute (ETSI), GSM Association (GSMA), etc.) or a new interface of the network device may be provided in order to support the communication (e.g., transmission and reception of messages, information elements (IE), attribute value pairs (AVPs), etc.) between network devices and the network slice usage subscription service logic of the network device, as described herein. According to various exemplary implementations, the interface of the network device may be a service-based interface, a reference point-based interface, an Open Radio Access Network (O-RAN) interface, or some other type of interface.

Access network 105 may include one or multiple networks of one or multiple types and technologies. For example, access network 105 may be implemented to include a next generation RAN (e.g., a Fifth Generation (5G)-access network (5G-AN) or a 5G-RAN (referred to herein as simply a 5G-RAN)), another type of future generation RAN, a Fourth Generation (4G) RAN (e.g., an Evolved UMTS Terrestrial Radio Access Network (E-UTRAN) of a Long Term Evolution (LTE) network), a 4.5G RAN (e.g., an E-UTRAN of an LTE-Advanced (LTE-A) network), an RAN of an LTE-A Pro network, and/or another type of RAN (e.g., a legacy Third Generation (3G) RAN, etc.). Access network 105 may further include other types of wireless networks, such as a Wi-Fi network, a Worldwide Interoperability for Microwave Access (WiMAX) network, a local area network (LAN), a Bluetooth network, a personal area network (PAN), a Citizens Broadband Radio System (CBRS) network, or another type of wireless network (e.g., a legacy Third Generation (3G) RAN, etc.). Access network 105 may include a wired network, an optical network, or another type of network that may provide communication with core network 150, for example.

According to various exemplary embodiments, access network 105 may be implemented to include various architectures of wireless service, such as, for example, macrocell, microcell, femtocell, picocell, metrocell, new radio (NR) cell, LTE cell, non-cell, or another type of architecture. Additionally, according to various exemplary embodiments, access network 105 may be implemented according to various wireless technologies (e.g., RATs, etc.), wireless standards, wireless frequencies/bands/carriers (e.g., centimeter (cm) wave, millimeter (mm) wave, below 6 Gigahertz (GHz), above 6 GHz, licensed radio spectrum, unlicensed radio spectrum, etc.), and/or other attributes of radio communication.

Depending on the implementation, access network 105 may include one or multiple types of network devices, such as access devices 110. For example, access devices 110 may include an evolved Node B (eNB), a next generation Node B (gNB), an evolved Long Term Evolution (eLTE) eNB, a radio network controller (RNC), a remote radio head (RRH), a baseband unit (BBU), a centralized unit (CU), a distributed unit (DU), a small cell node (e.g., a picocell device, a femtocell device, a microcell device, a home eNB, etc.), a future generation wireless access device, another type of wireless node (e.g., a WiMax device, a hotspot device, etc.) that provides a wireless access service. According to some exemplary implementations, access devices 110 may include a combined functionality of multiple RATs (e.g., 4G and 5G functionality).

Core network 150 may include one or multiple networks of one or multiple types and technologies. According to an exemplary embodiment, core network 150 includes a complementary network of access network 105. For example, core network 150 may be implemented to include an Evolved Packet Core (EPC) of an LTE network, an LTE-Advanced (LTE-A) network, an LTE-A Pro network, a next generation core (NGC) network, and/or a future generation network. Core network 150 may include a legacy core network.

Depending on the implementation, core network 150 may include various types of network devices, such as core devices 155. For example, core devices 155 may include a mobility management entity (MME), a packet gateway (PGW), an ePDG, a serving gateway (SGW), a home agent (HA), a General Packet Radio Service (GPRS) support node (GGSN), a home subscriber server (HSS), an authentication, authorization, and accounting (AAA) server, a policy charging and rules function (PCRF), a charging system (CS), a user plane function (UPF), a Non-3GPP Interworking Function (N3IWF), an AMF, a session management function (SMF), a unified data management (UDM) device, a unified data repository (UDR) device, an authentication server function (AUSF), a network slice selection function (NSSF), a network repository function (NRF), a PCF, a network data analytics function (NWDAF), a NEF, a lifecycle management (LCM) device, and/or an AF. According to other exemplary implementations, core devices 155 may include additional, different, and/or fewer network devices than those described. For example, core devices 155 may include a non-standard and/or a proprietary network device, or another type of network device that may be well-known but not particularly mentioned herein. Core devices 155 may also include a network device that provides a multi-RAT functionality (e.g., 4G and 5G), such as an SMF with PGW control plane functionality (e.g., SMF+PGW-C), a UPF with PGW user plane functionality (e.g., UPF+PGW-U), a service capability exposure function (SCEF) with a NEF (SCEF+NEF), and/or other combined nodes (e.g., an HSS with a UDM and/or UDR, an MME with an AMF, etc.). Access network 105 and/or core network 150 may include a public network, a private network, and/or an ad hoc network.

External network 170 may include one or multiple networks. For example, external network 170 may be implemented to include a service or an application-layer network, the Internet, the World Wide Web (WWW), an Internet Protocol Multimedia Subsystem (IMS) network, a Rich Communication Service (RCS) network, a cloud network, a packet-switched network, a private network, a public network, a multi-access edge computing (MEC) network (also known as a mobile edge computing), a fog network, or other type of network that hosts an end device application or service.

Depending on the implementation, external network 170 may include various network devices, such as external devices 175. For example, external devices 175 may provide various applications, services, or other type of end device assets, such as servers (e.g., web, application, cloud, etc.), mass storage devices, and/or data center devices. According to various exemplary implementations, the application services may pertain to broadband services in dense areas (e.g., pervasive video, smart office, operator cloud services, video/photo sharing, etc.), broadband access everywhere (e.g., 50/100 Mbps, ultra low-cost network, etc.), higher user mobility (e.g., high speed train, remote computing, moving hot spots, etc.), Internet of Things (IoTs) (e.g., smart wearables, sensors, mobile video surveillance, smart cities, connected home, etc.), extreme real-time communications (e.g., tactile Internet, augmented reality, etc.), lifeline communications (e.g., natural disaster, emergency response, etc.), ultra-reliable communications (e.g., automated traffic control and driving, collaborative robots, health-related services (e.g., monitoring, remote surgery, etc.), drone delivery, public safety, etc.), broadcast-like services, real-time communications (e.g., voice, video conferencing, etc.), and/or messaging (e.g., texting, etc.). External devices 175 may also include network devices that provide other network-related functions, such as network management, load balancing, security, authentication and authorization, policy control, billing, and routing. External network 170 may include a private network and/or a public network.

End device 199 includes a device that has computational and wireless communicative capabilities. Depending on the implementation, end device 199 may be a mobile device, a portable device, a stationary device, a device operated by a user (e.g., UE, etc.), or a device not operated by a user (e.g., an Internet of Things (IoT) device, etc.). For example, end device 199 may be implemented as a smartphone, a mobile phone, a personal digital assistant, a tablet, a netbook, a phablet, a wearable device (e.g., a watch, glasses, etc.), a computer, a device in a vehicle, a gaming device, a music device, an IoT device, or other type of wireless device. End device 199 may be configured to execute various types of software (e.g., applications, programs, etc.). The number and the types of software may vary among end devices 199.

Figure 2A:
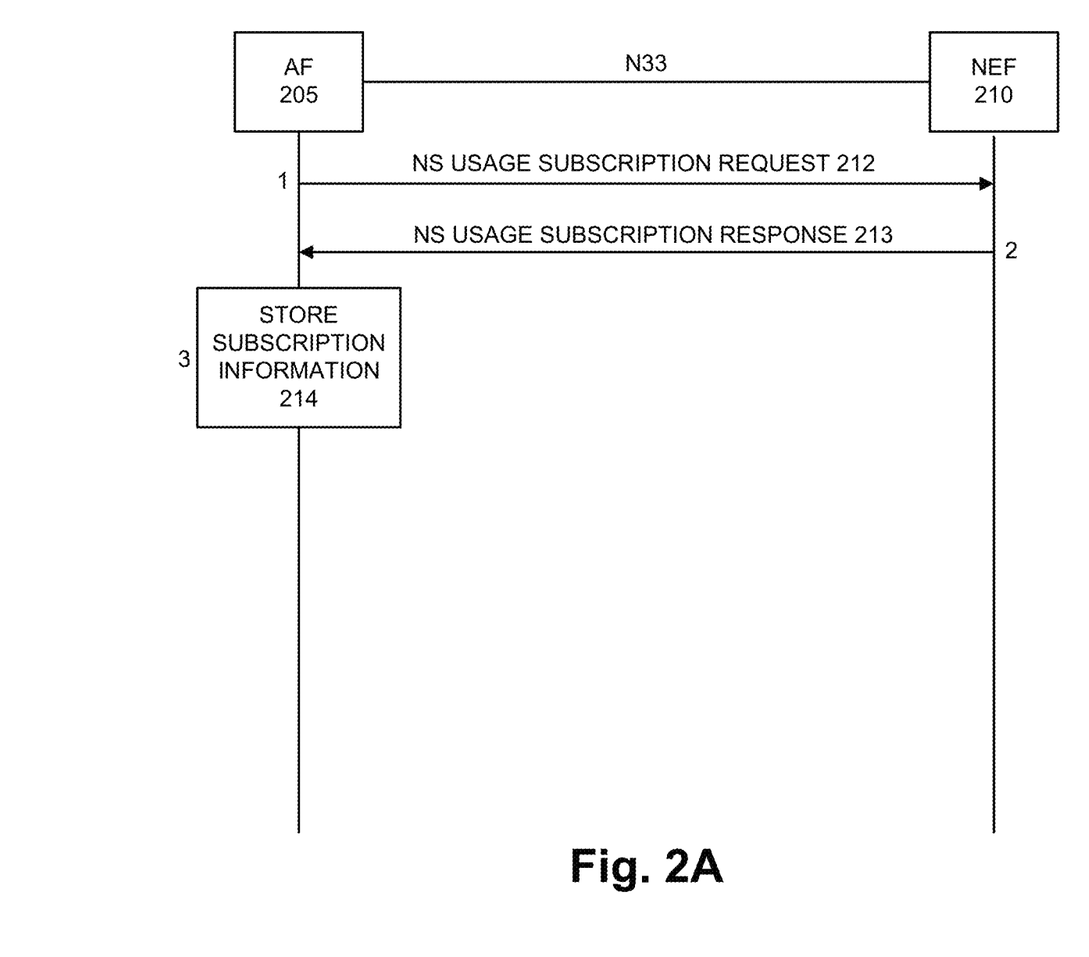
FIG. 2A is a diagram illustrating an exemplary process in which an exemplary embodiment of the network slice usage subscription service may be implemented.

FIG. 2A is a diagram illustrating an exemplary process of the network slice usage subscription service. For example, the process may relate to an on-boarding of the network slice usage subscription service by a network device. According to this example, an AF 205 may subscribe to the network slice usage subscription service. Additionally, according to this example, AF 205 may communicate with a NEF 210 via a modified or new N33 interface as a part of the on-boarding or initial configuration procedure (e.g., sign-up for the network slice usage subscription service). The messages described are exemplary. The operations performed by AF 205 and NEF 210 are also exemplary.

As described herein, AF 205 and NEF 210 may provide functions and operate according to various standards (e.g., 3GPP, ITU, ETSI, etc.), which have been omitted for the sake of brevity. Additionally, AF 205 and NEF 210 may provide a function and communications which are beyond those functions and communications of the standard in support of the network slice usage subscription service.

Referring to FIG. 2A, in step (1), AF 205 may generate and transmit a network slice usage subscription request 212 to NEF 210. The request 212 may include information to support an on-boarding process for the network slice usage subscription service. For example, the request 212 may include an identifier of AF 205, an identifier of a service provider of AF 205, and other relevant information that may be configurable. In response to the receiving the request 212, in step (2), NEF 210 may generate and transmit a network slice usage subscription response 213 to AF 205. The response 213 may include subscription information. For example, the subscription information may include S-NS-SAIs and/or NSI-IDs, which may identify network slices, and characteristic information pertaining to those network slices (e.g., type of application service supported by a network slice, etc.). In response to receiving the response 213, in step (3), AF 205 may store the subscription information 214.

FIG. 2A illustrates exemplary messaging for the process of the network slice usage subscription service, according to other exemplary embodiments, the process may include additional and/or different messages which may be communicated. For example, there may be communications related to authentication, authorization, and/or another type of security measure. Additionally, or alternatively, according to other exemplary embodiments, additional and/or different network devices may be involved in such communications. Further, according to other exemplary embodiments, the operations performed by a network device may be different and/or involve a different network device than those illustrated in FIG. 2A.

Figure 2B:
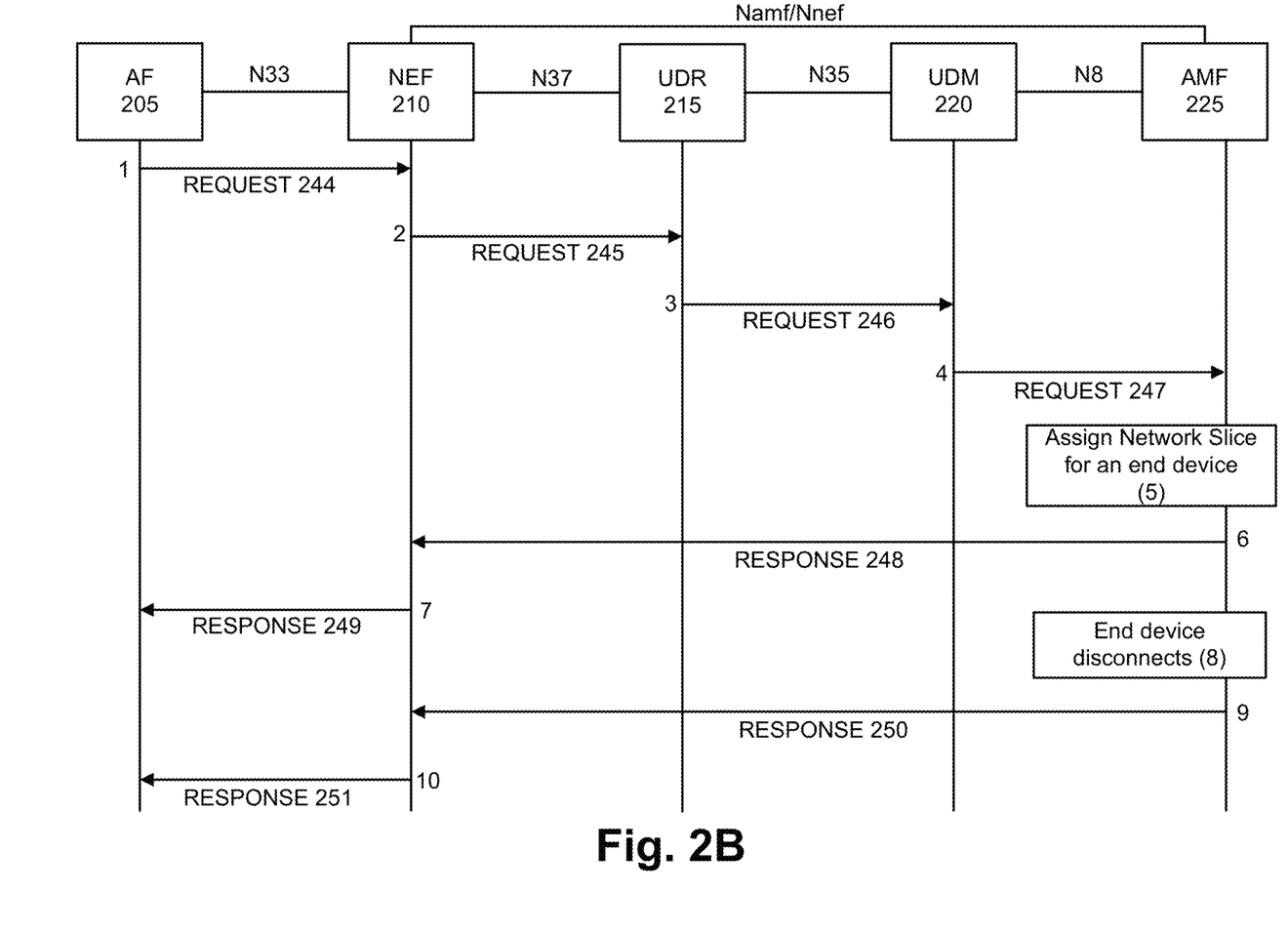
FIG. 2B is a diagram illustrating another exemplary process in which an exemplary embodiment of the network slice usage subscription service may be implemented.

FIG. 2B is a diagram illustrating an exemplary process of the network slice usage subscription service. For example, the process may include a signaling procedure between AF 205 and other network devices of a core network, such as NEF 210, a UDR 215, a UDM 220, and an AMF 225. According to other exemplary embodiments, the network devices and/or the signaling procedure may be different. For example, UDR 215 and UDM 220 may be implemented as an integrated or combined network device (e.g., UDM+UDR) depending on the architecture implemented (e.g., a stateful UDM, a stateless UDM, etc.), the functions configured for the UDR and the UDM, the type of data stored by the UDR and the UDM, and so forth. The messages described are exemplary. The process relates to an event notification service of the network slice usage subscription service.

As illustrated, messages between AF 205 and NEF 210 may be communicated via the modified or new N33 interface; messages between NEF 210 and UDR 215 may be communicated via a modified or new N37 interface; messages between UDR 215 and UDM 220 may be communicated via a modified or new N35 interface, messages between UDM 220 and AMF 225 may be communicated via a modified or new N8 interface, and messages from AMF 225 to NEF 210 may be communicated via a modified or new Namf interface. As previously mentioned, the various interfaces may support the transmission and reception of messages in support of the network slice usage subscription service. The various interfaces may include a modification to a standard interface (e.g., 3GPP, etc.) or constitute a new interface. Additionally, the interfaces are also exemplary and other types of interfaces, such as a modified or new service-based interface (e.g., Namf, Nnef, etc.,), a modified or new point-to-point interface, etc., may be used as previously mentioned. As part of the Service-Based Architecture, the AMF may subscribe to UDM messages and/or NEF messages so that network performance relating to the network may be received for network slice selection decisions.

As described herein, UDR 215, UDM 220, and AMF 225 may provide functions and operate according to various standards (e.g., 3GPP, ITU, ETSI, etc.), which have been omitted for the sake of brevity. Additionally, UDR 215, UDM 220, and AMF 225 may provide a function and communications which are beyond those functions and communications of the standard in support of the network slice usage subscription service.

Referring to FIG. 2B, in step (1), AF 205 may generate and transmit a request 244 to NEF 210 via the N33 interface. Request 244 may include a network slice identifier (e.g., S-NSSAI, NSI ID, etc.). Request 244 may also include an end device identifier that identifies end device 199. Request 244 may further include a request to be notified when end device 199, which is identified by the end device identifier, is using a network slice, which is identified by the network slice identifier, and when end device 199 is no longer using the network slice, as described herein. AF 205 may use subscription information, as previously described, to generate request 244. AF 205 may generate and transmit request 244 according to various configurations (e.g., a polling schedule, receipt of a message from another network device, etc.).

In step (2), in response to receiving request 244, NEF 210 may generate and transmit a request 245 to UDR 215 via the N37 interface. In step (3), in response to receiving request 245, UDR 215 may generate and transmit a request 246 to UDM 220 via the N35 interface.

In step (4), in response to receiving request 246, UDM 220 may generate and transmit a request 247 to AMF 225 via the N8 interface. According to an exemplary implementation, the request 247 may include a UE profile update message pertaining to the end device 199 of relevance or vice versa. UDM 220 may also select the appropriate AMF 225 (e.g., from among multiple AMFs) that may be serving the end device 199 of relevance.

According to an exemplary scenario, subsequent to receiving request 247, AMF 225 may receive a session request from end device 199 (e.g., via access network 105) (not illustrated in FIG. 2B). According to another exemplary scenario, subsequent to receiving request 247, AMF 225 may receive a session request to initiate an application service session with end device 199 (e.g., from an application server (AS) that provides an application service).

In step (5), responsive to the session request from end device 199 (or a network device), AMF 225 may assign a network slice to end device 199. In step (6), subsequent to the assignment, AMF 225 may generate and transmit a response 248 to NEF 210 via an Namf interface. The response 248 may include a network slice identifier and an end device identifier that identifies end device 199. In step (7), in response to receiving response 248, NEF 210 may generate and transmit a response 249 to AF 205 via the N33 interface. In response to receiving the response 249, AF 205 may perform various operations, as described herein.

In step (8), when end device 199 disconnects from all sessions supported by the network slice of relevance, in step (9), AMF 225 may generate and transmit a response 250 to NEF 210 via the Namf interface. Response 250 may indicate that end device 199 is no longer using the network slice. In step (10), in response to receiving the response 250, NEF 210 may generate and transmit a response 251 to AF 205 via the N33 interface. In response to receiving the response 251, AF 205 may perform various operations, as described herein.

As previously described, various network devices, which do not otherwise have access to network slice usage information, may be provided with network slice usage information via the network slice usage subscription service. The network device may use the network slice usage information in various configurable ways. For example, the AF may initiate another application service that is not supported by the current network slice. In this way, the AF may communicate to the end device and/or the core network to initiate a network slice that supports the other application service.

According to other examples, the AF may use the network slice usage information to influence UPF (re)selection and traffic routing via a PCF or a NEF. According to yet other examples, the AF may use the network slice usage information to perform other configurable operations or tasks, such as making requests to the core network and/or providing information (e.g., policy-related, etc.). As a result, network performance may be improved at least based on a reduction of latency for processing or provisioning this information to an application session (e.g., establishment of a PDU session, modification of a PDU session, a future PDU session, etc.) and associated network slice (and network devices supporting the network slice, such as a RAN device (e.g., access device 110), a core device (e.g., core device 155), an aggregation point for a traffic being sourced for the network slice, etc.), a UE or UE group, etc.). Depending on the circumstances, the AF may perform an operation responsive to network slice usage information indicating that the end device is using a network slice, that the end device has established a pattern of network slice usage, or that the end device is no longer using the network slice, as described herein. For example, with the knowledge of network slice usage of a UE, the AF can choose to continue with the communication that suits a UE's current slice usage, or prompt the UE to invoke the application that may trigger higher bandwidth, higher reliability, and/or lower latency slice usage. This will in turn improve seamless user experience. This may also provide AF more options to drive effective communication for better user services. The AF may analyze application behavior and requirements and determine that a separate network slice type should be utilized in the future, e.g., due to performance considerations, or cost considerations. According to another example, an AF may determine the congestion level of the current network slice and if the congestion level reaches a certain threshold, the AF may poll the NEF for a network slice with lower utilization and terminate the connection so that when the UE reattaches, the AMF may send the new S-NSSAIs to the UE which then may reconnect with the AF. According to yet another example, when an NWDAF determines that a congestion threshold is reached, the AF may poll a NEF to see what a UE and the AF have subscribed to. The AF may instruct an NSSF to assign a different S-NSSAI for retrieval by an AMF and may instruct the NEF that the new S-NSSAI is loaded so that the AF can re initiate the UE's connection.

FIG. 2B illustrates exemplary messaging for the process of the network slice usage subscription service, according to other exemplary embodiments, the process may include additional and/or different messages which may be communicated. Further, according to other exemplary embodiments, the operations performed by a network device may be different and/or involve a different network device than those illustrated in FIG. 2B. For example, according to other exemplary embodiments, the AMF may report network slice usage information to the AF via the NEF according to a schedule (e.g., periodically, etc.) and/or another type of configuration (e.g., data size of the information, a threshold number of end devices using and/or no longer using a network slice, etc.) or subscription-based.

According to an exemplary embodiment, the network slice usage subscription service may include subscription information. For example, referring to a table 300 in FIG. 3, exemplary network slice usage information is illustrated. According to an exemplary embodiment, the network slice usage information may be stored by or accessible by AF 205. Table 300 may include a network slice identifier field 305, an attribute field 310, and an end device identifier field 315. As further illustrated, table 300 includes entries 330-1 through 330-X (also referred as entries 330, or individually or generally as entry 330) that each includes a grouping of fields 305, 310, and 315 that are correlated (e.g., a record, etc.). The network slice usage information is illustrated in tabular form merely for the sake of description. In this regard, the network slice usage information may be implemented in a data structure different from a table (e.g., a list, a flat file, etc.), a database, or other type of data file.

Figure 3:
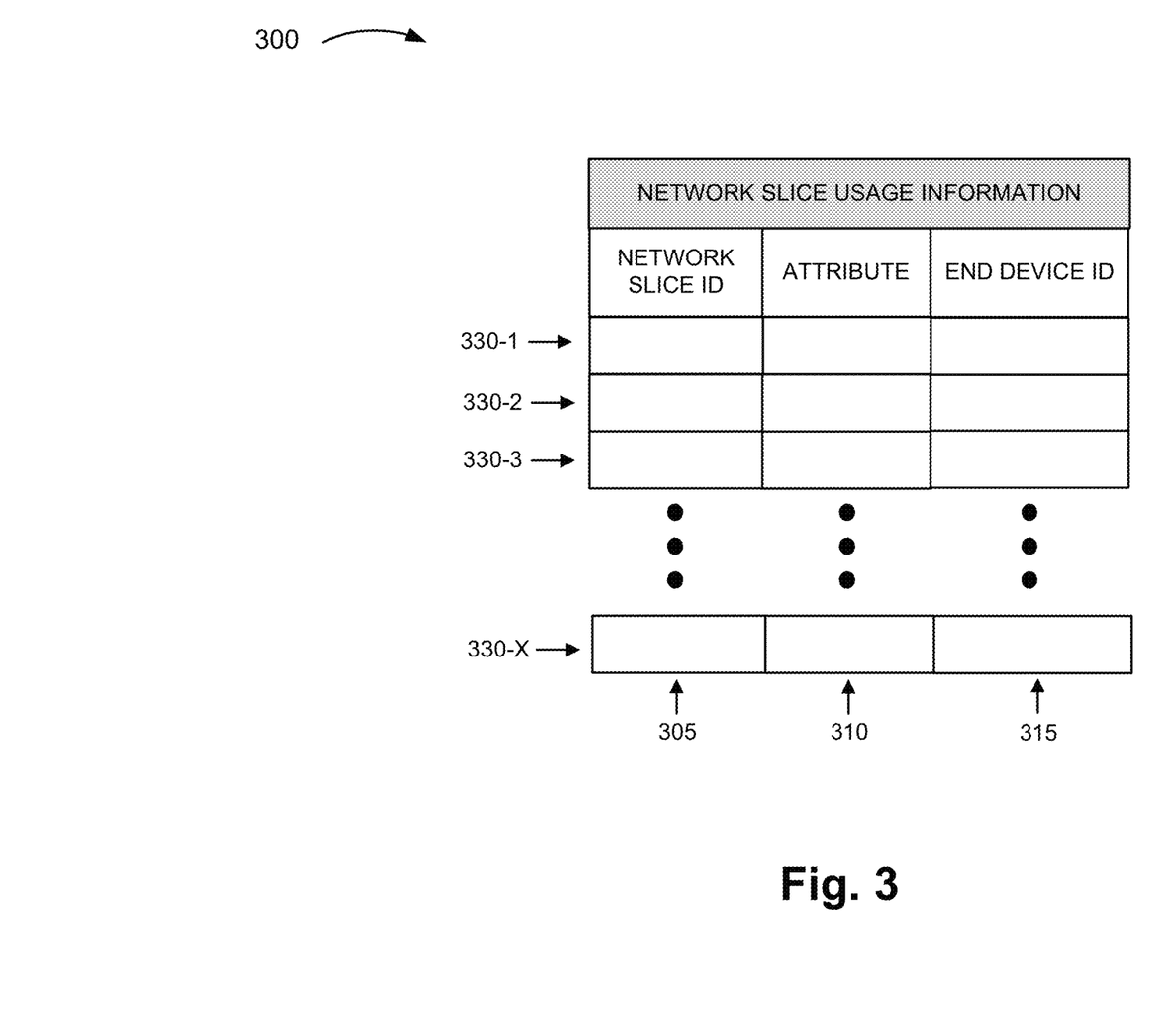
FIG. 3 is a diagram illustrating exemplary network slice usage information of an exemplary embodiment of the network slice usage subscription service.

Network slice identifier field 305 may store an identifier of a network slice. For example, network slice identifier field 305 may store a Single-Network Slice Selection Assistance Information (S-NSSAI), a Network Slice Instance Identifier (NSI ID), or some other type of network slice identifier pertaining to a network slice.

Attribute field 310 may store a characteristic pertaining to a network slice. For example, attribute field 310 may store information that indicates an application service that the network slice supports. For example, attribute field 310 may indicate a category of an application service (e.g., real-time, non-real time, mission critical, video streaming, IoT, delay tolerant, massive IoT (MIoT), eMBB, etc.), a specific name of an application service (e.g., Firefox, etc.), or other types of information (e.g., network slice templates, slice/service type (SSI), etc.).

End device identifier field 315 may store an identifier of an end device or a group of end devices. For example, end device identifier field 315 may store a general public subscription identifier (GPSI), a subscription permanent identifier (SUFI), a permanent equipment identifier (PEI), an internal group identifier (IGI), and/or other types of identifiers that may identify an end device, a group of end devices, and so forth.

According to other exemplary implementations, table 300 may store additional, fewer, and/or different instances of network slice usage information in support of the network slice usage subscription service, as described herein.

Figure 4:
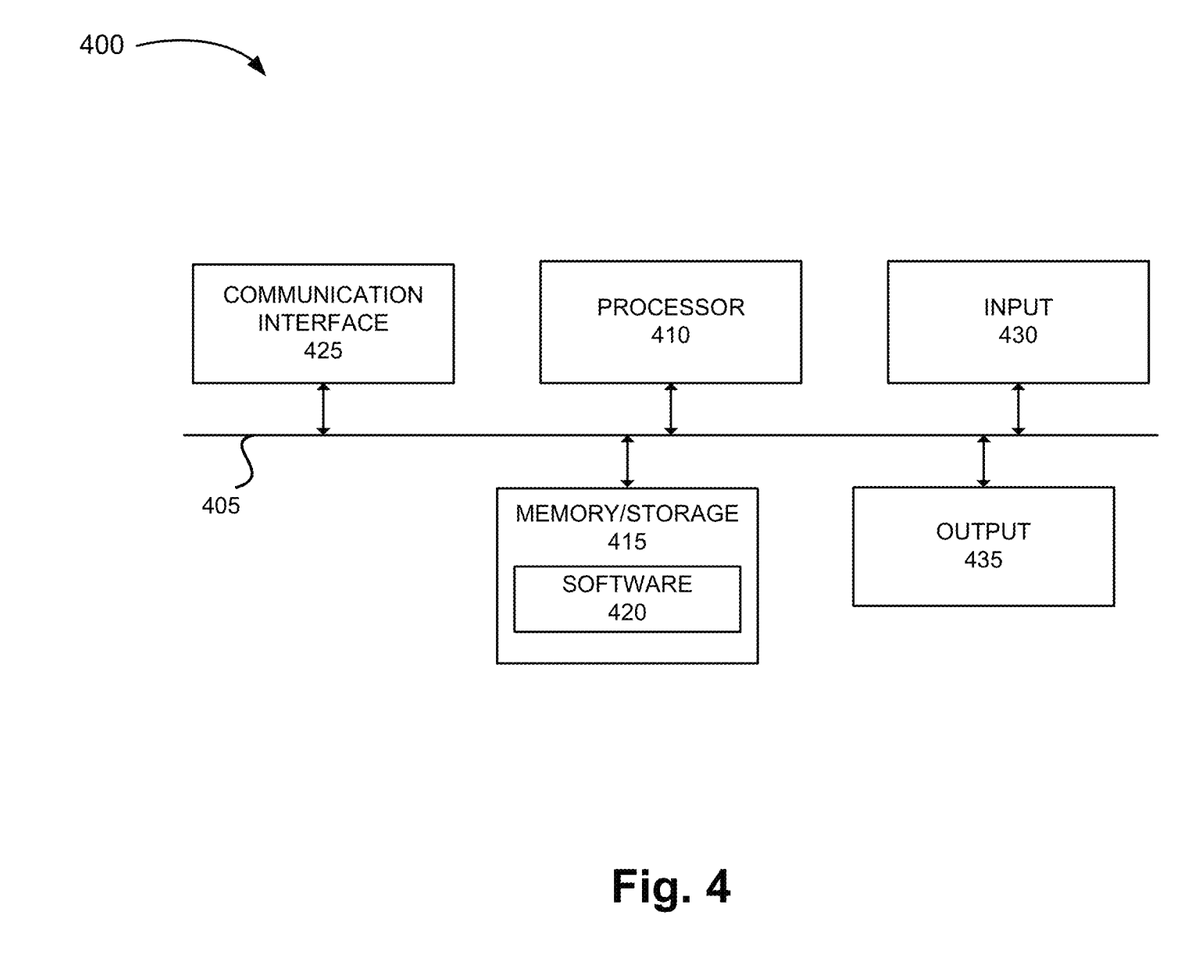
FIG. 4 is a diagram illustrating exemplary components of a device that may correspond to one or more of the devices illustrated and described herein.

FIG. 4 is a diagram illustrating exemplary components of a device 400 that may be included in one or more of the devices described herein. For example, device 400 may correspond to access devices 110, core devices 155, external devices 175, end devices 199, AF 205, NEF 210, UDR 215, UDM 220, AMF 225, and other types of network devices or logic, as described herein. As illustrated in FIG. 4, device 400 includes a bus 405, a processor 410, a memory/storage 415 that stores software 420, a communication interface 425, an input 430, and an output 435. According to other embodiments, device 400 may include fewer components, additional components, different components, and/or a different arrangement of components than those illustrated in FIG. 4 and described herein.

Bus 405 includes a path that permits communication among the components of device 400. For example, bus 405 may include a system bus, an address bus, a data bus, and/or a control bus. Bus 405 may also include bus drivers, bus arbiters, bus interfaces, clocks, and so forth.

Processor 410 includes one or multiple processors, microprocessors, data processors, co-processors, graphics processing units (GPUs), application specific integrated circuits (ASICs), controllers, programmable logic devices, chipsets, field-programmable gate arrays (FPGAs), application specific instruction-set processors (ASIPs), system-on-chips (SoCs), central processing units (CPUs) (e.g., one or multiple cores), microcontrollers, neural processing unit (NPUs), and/or some other type of component that interprets and/or executes instructions and/or data. Processor 410 may be implemented as hardware (e.g., a microprocessor, etc.), a combination of hardware and software (e.g., a SoC, an ASIC, etc.), may include one or multiple memories (e.g., cache, etc.), etc.

Processor 410 may control the overall operation or a portion of operation(s) performed by device 400. Processor 410 may perform one or multiple operations based on an operating system and/or various applications or computer programs (e.g., software 420). Processor 410 may access instructions from memory/storage 415, from other components of device 400, and/or from a source external to device 400 (e.g., a network, another device, etc.). Processor 410 may perform an operation and/or a process based on various techniques including, for example, multithreading, parallel processing, pipelining, interleaving, etc.

Memory/storage 415 includes one or multiple memories and/or one or multiple other types of storage mediums. For example, memory/storage 415 may include one or multiple types of memories, such as, a random access memory (RAM), a dynamic random access memory (DRAM), a static random access memory (SRAM), a cache, a read only memory (ROM), a programmable read only memory (PROM), an erasable PROM (EPROM), an electrically EPROM (EEPROM), a single in-line memory module (SIMM), a dual in-line memory module (DIMM), a flash memory (e.g., 2D, 3D, NOR, NAND, etc.), a solid state memory, and/or some other type of memory. Memory/storage 415 may include a hard disk (e.g., a magnetic disk, an optical disk, a magneto-optic disk, a solid state disk, etc.), a Micro-Electromechanical System (MEMS)-based storage medium, and/or a nanotechnology-based storage medium. Memory/storage 415 may include drives for reading from and writing to the storage medium.

Memory/storage 415 may be external to and/or removable from device 400, such as, for example, a Universal Serial Bus (USB) memory stick, a dongle, a hard disk, mass storage, off-line storage, or some other type of storing medium (e.g., a compact disk (CD), a digital versatile disk (DVD), a Blu-Ray disk (BD), etc.). Memory/storage 415 may store data, software, and/or instructions related to the operation of device 400.

Software 420 includes an application or a program that provides a function and/or a process. As an example, with reference to AF 205, software 420 may include an application that, when executed by processor 410, provides a function of the network slice usage subscription service, as described herein. Additionally, for example, with reference to NEF 210, UDR 215, UDM 220, and AMF 225, software 420 may include an application that, when executed by processor 410, provides a function of the network slice usage subscription service. Software 420 may also include firmware, middleware, microcode, hardware description language (HDL), and/or other form of instruction. Software 420 may also be virtualized. Software 420 may further include an operating system (OS) (e.g., Windows, Linux, Android, proprietary, etc.).

Communication interface 425 permits device 400 to communicate with other devices, networks, systems, and/or the like. Communication interface 425 includes one or multiple wireless interfaces and/or wired interfaces. For example, communication interface 425 may include one or multiple transmitters and receivers, or transceivers. Communication interface 425 may operate according to a protocol stack and a communication standard. Communication interface 425 may include an antenna. Communication interface 425 may include various processing logic or circuitry (e.g., multiplexing/de-multiplexing, filtering, amplifying, converting, error correction, application programming interface (API), etc.). Communication interface 425 may be implemented as a point-to-point interface, a service based interface, etc., as previously described. Communication interface 425 may be implemented to include logic that supports the network slice usage subscription service, such as the transmission and reception of messages, as described herein.

Input 430 permits an input into device 400. For example, input 430 may include a keyboard, a mouse, a display, a touchscreen, a touchless screen, a button, a switch, an input port, speech recognition logic, and/or some other type of visual, auditory, tactile, etc., input component. Output 435 permits an output from device 400. For example, output 435 may include a speaker, a display, a touchscreen, a touchless screen, a light, an output port, and/or some other type of visual, auditory, tactile, etc., output component.

As previously described, a network device may be implemented according to various computing architectures and according to various network architectures (e.g., a virtualized function, etc.). Device 400 may be implemented in the same manner. For example, device 400 may be instantiated, created, deleted, or some other operational state during its life-cycle (e.g., refreshed, paused, suspended, rebooting, or another type of state or status), using well-known virtualization technologies (e.g., hypervisor, container engine, virtual container, virtual machine, etc.) in a network.

Device 400 may perform a process and/or a function, as described herein, in response to processor 410 executing software 420 stored by memory/storage 415. By way of example, instructions may be read into memory/storage 415 from another memory/storage 415 (not shown) or read from another device (not shown) via communication interface 425. The instructions stored by memory/storage 415 cause processor 410 to perform a process and/or a function, as described herein. Alternatively, for example, according to other implementations, device 400 performs a process and/or a function as described herein based on the execution of hardware (processor 410, etc.).

Figure 5:
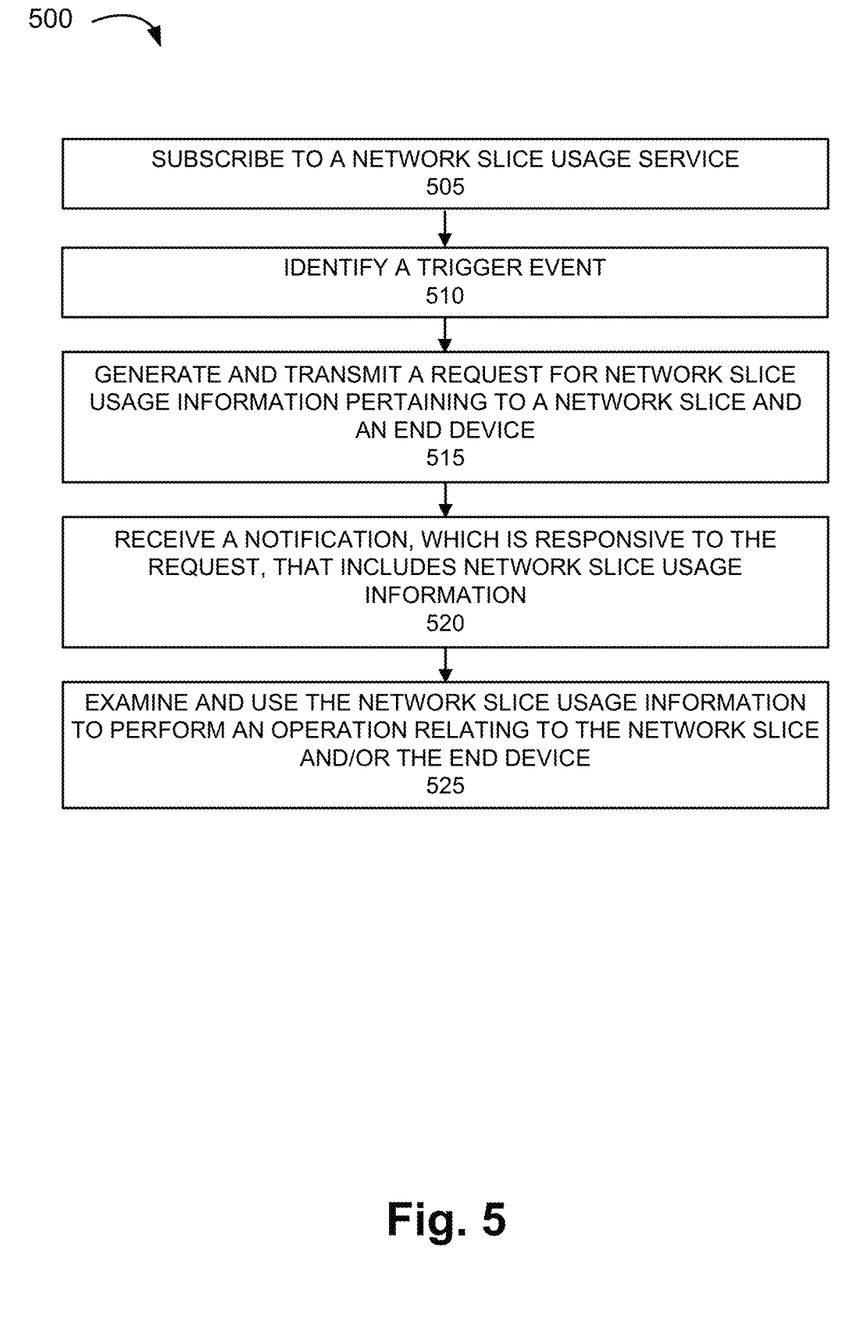
FIG. 5 is a flow diagram illustrating an exemplary process of an exemplary embodiment of the network slice usage subscription service.

FIG. 5 is a flow diagram illustrating an exemplary process 500 of an exemplary embodiment of the network slice usage subscription service. According to an exemplary embodiment, AF 205 may perform steps of process 500. According to an exemplary implementation, processor 410 executes software 420 to perform a step illustrated in FIG. 5 and described herein. Alternatively, a step illustrated in FIG. 5 and described herein, may be performed by execution of only hardware.

Referring to FIG. 5, in block 505, AF 205 may subscribe to the network slice usage subscription service. For example, AF 205 may subscribe to this service based on communication with NEF 210. AF 205 may store network slice usage information as a part of the subscription procedure, as described herein.

In block 510, AF 205 may identify a trigger event. For example, AF 205 may identify a polling trigger for obtaining network slice usage information or some other configurable trigger event.

In block 515, based on the identified trigger, AF 205 may generate and transmit a request for network slice usage information. The request may include a network slice identifier, an end device identifier, and a request for network slice usage information relating to the network slice identifier and the end device identifier. AF 205 may transmit the request to NEF 210. As previously described, the request may be routed to AMF 225 that is servicing the end device.

In block 520, AF 205 may receive a notification from NEF 210. The notification may include information that indicates that the end device associated with the end device identifier is using a network slice identified by the network slice identifier.

In block 525, AF 205 may examine and use the network slice usage information to perform an operation relating to the network slice and/or the end device. For example, the operation may relate to UPF (re)selection, traffic routing, initiating an application service not supported by the current network slice, or another configurable operation. AF 205 may use other information (e.g., end device profile, user subscription of the application service, application service state information, etc.) to perform the operation and/or determine whether the operation should be performed. For example, AF 205 may derive slice performance information to assess service level agreement compliance. Additionally, or alternatively, AF 205 may collect metrics as a basis to determine whether alternate slice types may (or should) be used for certain end device types. According to another example, AF 205 may use the network slice usage information for congestion management or performance. By way of further example, AF 205 may select a different performance characteristic depending on network performance and/or network state.

FIG. 5 illustrates an exemplary process 500 of the network slice usage subscription service, however, according to other embodiments, process 500 may include additional operations, fewer operations, and/or different operations than those illustrated in FIG. 5 and described herein. For example, process 500 may include AF 205 determining whether an operation relating to the network slice and/or the end device may be performed based on the network slice usage information.

Figure 6:
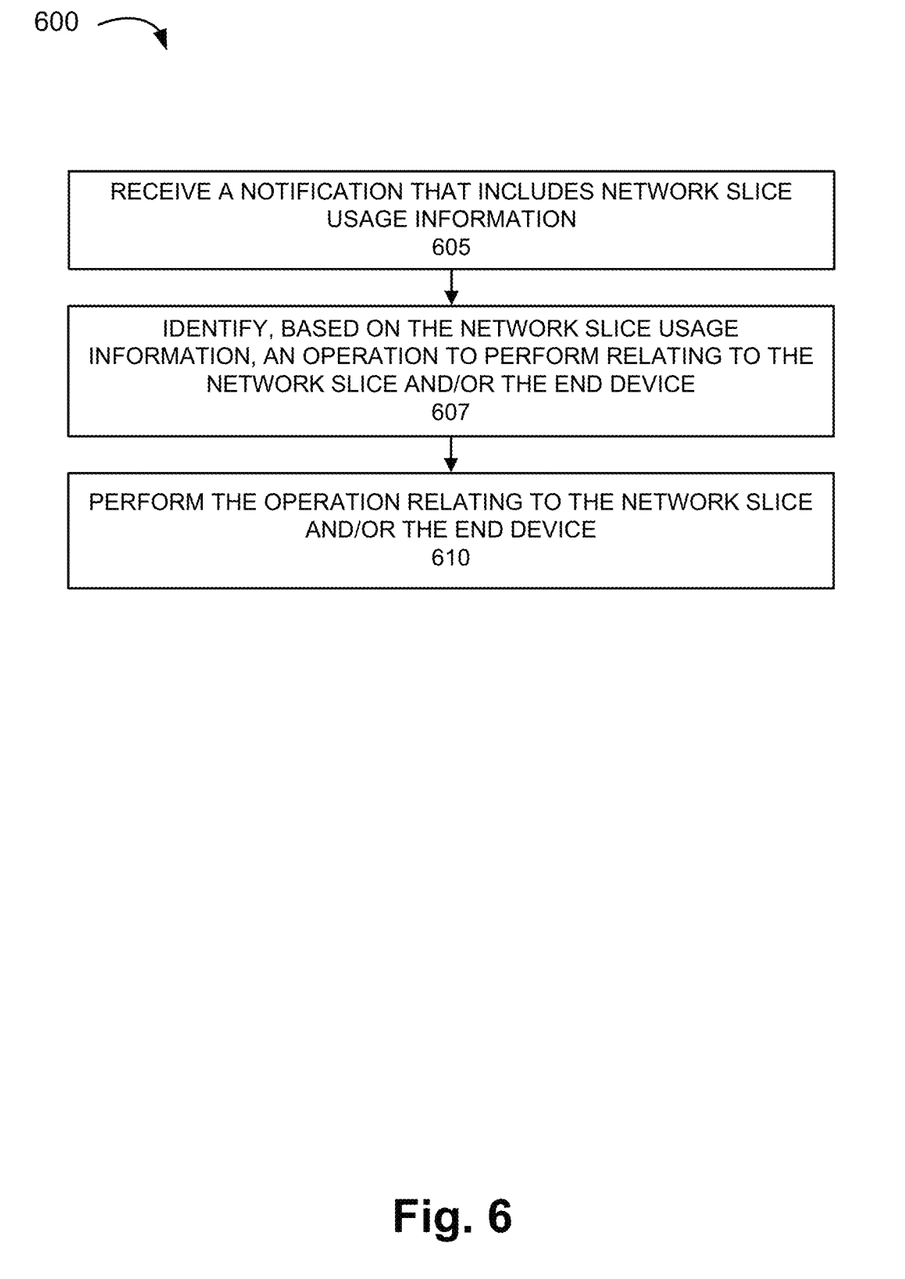
FIG. 6 is a flow diagram illustrating another exemplary process of an exemplary embodiment of the network slice usage subscription service.

FIG. 6 is a flow diagram illustrating an exemplary process 600 of another exemplary embodiment of the network slice usage subscription service. According to an exemplary embodiment, AF 205 may perform steps of process 600. According to an exemplary implementation, processor 410 executes software 420 to perform a step illustrated in FIG. 6 and described herein. Alternatively, a step illustrated in FIG. 6 and described herein, may be performed by execution of only hardware. Process 600 may be a continuation of process 500.

Referring to FIG. 6, in block 605, AF 205 may receive a notification from NEF 210. The notification may include information that indicates that the end device associated with the end device identifier is no longer using the network slice identified by the network slice identifier.

In block 607, AF 205 may identify an operation that may be performed based on an examination of the network slice usage information received in block 605, and maybe other information (e.g., end device profile, user subscription of the application service, application service state information, new service purchased, etc.).

In block 610, AF 205 may perform the operation relating to the network slice and/or the end device, such as selecting a new service slice, new performance characteristic, backing off of a communication establishment or initiating a communication establishment, among other things.

FIG. 6 illustrates an exemplary process 600 of the network slice usage subscription service, however, according to other embodiments, process 600 may include additional operations, fewer operations, and/or different operations than those illustrated in FIG. 6 and described herein. For example, process 600 may include AF 205 determining whether an operation relating to the network slice and/or the end device may be performed. Additionally, or alternatively, process 600 may include AF 205 determining and/or performing an operation relating to an end device that is still using the network slice.

As set forth in this description and illustrated by the drawings, reference is made to "an exemplary embodiment," "an embodiment," "embodiments," etc., which may include a particular feature, structure or characteristic in connection with an embodiment(s). However, the use of the phrase or term "an embodiment," "embodiments," etc., in various places in the specification does not necessarily refer to all embodiments described, nor does it necessarily refer to the same embodiment, nor are separate or alternative embodiments necessarily mutually exclusive of other embodiment (s). The same applies to the term "implementation," "implementations," etc.

The foregoing description of embodiments provides illustration, but is not intended to be exhaustive or to limit the embodiments to the precise form disclosed. Accordingly, modifications to the embodiments described herein may be possible. For example, various modifications and changes may be made thereto, and additional embodiments may be implemented, without departing from the broader scope of the invention as set forth in the claims that follow. The description and drawings are accordingly to be regarded as illustrative rather than restrictive.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items. The word "exemplary" is used herein to mean "serving as an example." Any embodiment or implementation described as "exemplary" is not necessarily to be construed as preferred or advantageous over other embodiments or implementations.

In addition, while series of blocks have been described with regard to the processes illustrated in FIGS. 5 and 6, the order of the blocks may be modified according to other embodiments. Further, non-dependent blocks may be performed in parallel. Additionally, other processes described in this description may be modified and/or non-dependent operations may be performed in parallel.

Embodiments described herein may be implemented in many different forms of software executed by hardware. For example, a process or a function may be implemented as "logic," a "component," or an "element." The logic, the component, or the element, may include, for example, hardware (e.g., processor 410, etc.), or a combination of hardware and software (e.g., software 420).

Embodiments have been described without reference to the specific software code because the software code can be designed to implement the embodiments based on the description herein and commercially available software design environments and/or languages. For example, various types of programming languages including, for example, a compiled language, an interpreted language, a declarative language, or a procedural language may be implemented.

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

Additionally, embodiments described herein may be implemented as a non-transitory computer-readable storage medium that stores data and/or information, such as instructions, program code, a data structure, a program module, an application, a script, or other known or conventional form suitable for use in a computing environment. The program code, instructions, application, etc., is readable and executable by a processor (e.g., processor 410) of a device. A non-transitory storage medium includes one or more of the storage mediums described in relation to memory/storage 415. The non-transitory computer-readable storage medium may be implemented in a centralized, distributed, or logical division that may include a single physical memory device or multiple physical memory devices spread across one or multiple network devices.

To the extent the aforementioned embodiments collect, store or employ personal information of individuals, it should be understood that such information shall be collected, stored, and used in accordance with all applicable laws concerning protection of personal information. Additionally, the collection, storage and use of such information can be subject to consent of the individual to such activity, for example, through well known "opt-in" or "opt-out" processes as can be appropriate for the situation and type of information. Collection, storage and use of personal information can be in an appropriately secure manner reflective of the type of information, for example, through various encryption and anonymization techniques for particularly sensitive information.

No element, act, or instruction set forth in this description should be construed as critical or essential to the embodiments described herein unless explicitly indicated as such.

All structural and functional equivalents to the elements of the various aspects set forth in this disclosure that are known or later come to be known are expressly incorporated herein by reference and are intended to be encompassed by the claims.

What is claimed is:

1. A method comprising:
subscribing, by a network device, to a service with a first network device;
receiving, by the network device from the first network device, network slice usage information pertaining to a network slice;
generating, by the network device after the receiving, a request to be notified when an end device is using the network slice and subsequently notified when no longer using the network slice;
transmitting, by the network device to the first network device, the request; and
receiving, by the network device, a notification that includes information indicating that the end device is using or no longer using the network slice.

2. The method of claim 1, wherein the network device includes an application function external from a core network.

3. The method of claim 1, further comprising:
analyzing, by the network device, at least one of an end device profile or a subscription of an application service pertaining to the end device; and
determining, by the network device based on the analyzing and the receiving, whether to perform an operation relating to the network slice or the end device.

4. The method of claim 1, further comprising:
performing, by the network device based on the notification, an operation relating to at least one of the network slice or the end device.

5. The method of claim 4, wherein the operation further relates to at least one of traffic routing, a user plane function (UPF) selection or reselection, or initiating an application service that is not supported by the network slice.

6. The method of claim 4, wherein the operation is directed to an establishment of an application session or a modification of the application session associated with the network slice.

7. The method of claim 1, wherein the request includes at least one of a first identifier of the network slice or a second identifier of the end device.

8. The method of claim 7, wherein the network slice usage information indicates an application service or a category of the application service supported by the network slice.

9. A network device comprising:
a processor, wherein the processor is configured to:
subscribe to a service with a first network device;
receive, from first network device, network slice usage information pertaining to a network slice;
generate, after the receiving, a request to be notified when an end device is using the network slice and subsequently notified no longer using the network slice;
transmit the request to the first network device; and
receive a notification that includes information indicating that the end device is using or no longer using the network slice.

10. The network device of claim 9, wherein the network device includes an application function external from a core network.

11. The network device of claim 9, wherein the processor is further configured to:
analyze at least one of an end device profile or a subscription of an application service pertaining to the end device; and
determine, based on the analyzing and the receiving, whether to perform an operation relating to the network slice or the end device.

12. The network device of claim 9, wherein the processor is further configured to:
perform an operation relating to the network slice or the end device based on the notification.

13. The network device of claim 12, wherein the operation further relates to at least one of traffic routing, a user plane function (UPF) selection or reselection, or initiating an application service that is not supported by the network slice.

14. The network device of claim 12, wherein the operation is directed to an establishment of an application session or a modification of the application session associated with the network slice.

15. The network device of claim 9, wherein the request includes at least one of a first identifier of the network slice or a second identifier of the end device.

16. The network device of claim 15, wherein the network slice usage information indicates an application service or a category of the application service supported by the network slice.

17. A non-transitory computer-readable storage medium storing instructions executable by a processor of a network device, wherein the instructions are configured to:
subscribe to a service with a first network device;
receive, from first network device, network slice usage information pertaining to a network slice;
generate, after the receiving, a request to be notified when an end device is using the network slice and subsequently notified no longer using the network slice;
transmit the request to the first network device; and
receive a notification that includes information indicating that the end device is using or no longer using the network slice.

18. The non-transitory computer-readable storage medium of claim 17, wherein network device includes an application function external from a core network.

19. The non-transitory computer-readable storage medium of claim 17, wherein the instructions further comprise instructions configured to:
perform an operation relating to at least one of the network slice or the end device based on the notification.

20. The non-transitory computer-readable storage medium of claim 19, wherein the operation further relates to at least one of traffic routing, a user plane function (UPF) selection or reselection, or initiating an application service that is not supported by the network slice.

* * * * *